Dec. 1, 1953  W. A. JOHNSON ET AL  2,661,422
SLOTTED ANTENNA SYSTEM
Filed Feb. 21, 1949
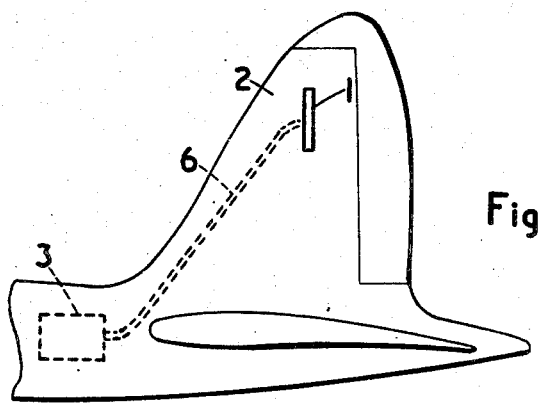
Fig. 1.
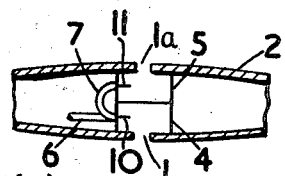
Fig. 1(a)
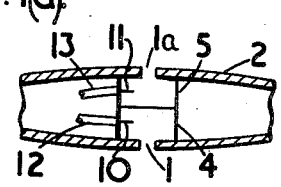
Fig 1(b)
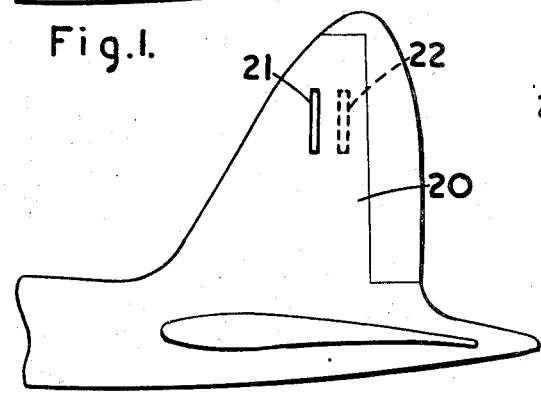
Fig. 2.
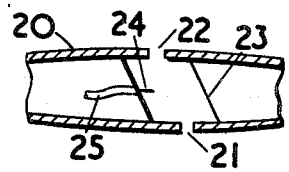
Fig. 2(a)
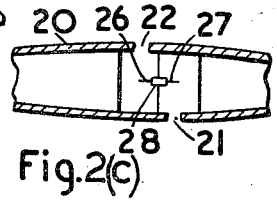
Fig. 2(c)
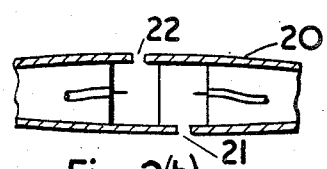
Fig. 2(b)
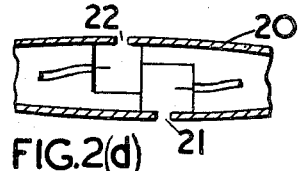
FIG. 2(d)
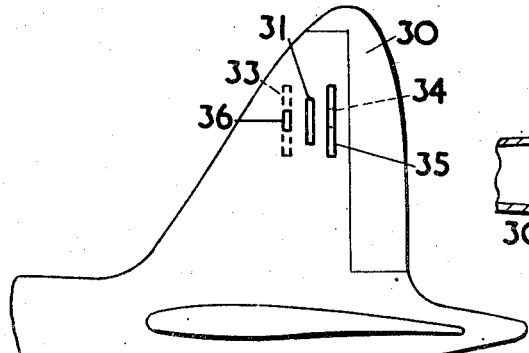
Fig. 3.
FIG 3(a)
Inventors
WILLIAM ARTHUR JOHNSON
REX HENRY JOHN CARY
Attorneys Patented Dec. 1, 1953

2,661,422

UNITED STATES PATENT OFFICE 2,661,422

SLOTTED ANTENNA SYSTEM

William Arthur Johnson, Farnborough, and Rex Henry John Cary, Great Malvern, England, assignors to the Minister of Supply, in His Majesty's Government of the United Kingdom of Great Britain and Northern Ireland Application February 21, 1949, Serial No. 77,648

13 Claims. (Cl. 250—33)

This invention relates to ultra high frequency radio slot antenna systems.

The polar diagram of a slot aerial in a metal sheet in the plane of polarisation, i. e. in a plane at right angles to the longitudinal axis of the slot, is a figure of eight, the minima occurring on the axis at the intersection of the plane of the sheet and the plane of polarisation due to the currents in the opposite surfaces of the sheet tending to cancel each other at the outer edges of the sheet. The same considerations apply when the "sheet" is a structure, having substantial thickness, and aligned slots are provided on opposite surfaces. Such an arrangement may be envisaged, for example, in the case of an aircraft flying surface such as the tail fin, a wing or a tail plane of an aircraft.

One object of this invention is to provide an antenna system employing such a structure, in which the tendency for the currents in the opposite surfaces of the structure or the radiations from slots on the opposite surfaces to cancel one another at the edges of the structure is reduced.

Another object of the invention is to provide such a system for transmitting or receiving plane polarised radiation having a more or less uniform omnidirectional polar diagram or radiation pattern in the plane of polarisation.

Yet another object of the invention is to provide an antenna system in a flying surface of an aircraft, in which the tendency for the radiations from opposite sides of the flying surface to cancel one another at the edges of the surface in the plane of polarisation is reduced.

A particular object of the invention is to provide a suppressed or dragless horizontally polarised aircraft antenna system having an omnidirection horizontal polar diagram or radiation pattern.

A still further object of the invention is to provide such a dragless horizontally polarised aircraft antenna system having an omnidirectional horizontal polar diagram, mounted in the tail fin of an aircraft.

The invention accordingly provides an antenna system comprising a conductive structure having two opposite surfaces meeting at an edge, a resonant slot radiator having a plane of polarisation cutting said edge formed in each of said surfaces and feeding means for conveying energy between each of said radiators and a radio equipment the two electrical path lengths afforded through the two radiators between said radio equipment and said edge in said plane of polarisation differing by a distance substantially an odd number of quarter wavelengths at the operating frequency.

Alternatively the invention provides an antenna system comprising a pair of substantially parallel conductive sheets terminating at a common boundary, a resonant slot radiator, having a plane of polarisation cutting said boundary, formed in each of said sheets, and feeding means for conveying energy between each of said resonators and a radio equipment, the distance of one of said radiators from said boundary in said plane of polarisation and the electrical length of the respective feeding means being together greater, by substantially an odd number of quarter wavelengths at the operating frequency, than the distance of the other radiator from said boundary in said plane of polarisation added to the electrical length of its respective feeding means.

In another aspect of the invention there is provided an antenna system comprising a conductive structure having two opposite surfaces meeting at a common boundary, a resonant slot radiator, having a plane of polarisation cutting said boundary, formed in each of said opposite surfaces, feeding means for conveying energy between each of said radiators and a radio equipment and parasitic radiating means associated with each of said resonant slot radiators and arranged to augment the radiations from their associated resonant slot radiators in opposite directions along said surfaces. In particular arrangements within this aspect of the invention a slot forming a parasitic reflector may be arranged between the radiator on one surface of the structure and the boundary and a similar slot, forming a parasitic reflector arranged on the other surface on the side of the respective radiator remote from the boundary. Alternatively these further slots may be arranged to act as parasitic directors, or a combination of such reflectors and directors may be employed.

In another arrangement according to the invention an antenna system is provided comprising a conductive structure having two opposite surfaces meeting at a common boundary, a resonant slot radiator, having a plane of polarisation cutting said boundary, formed in each of said opposite surfaces, feeding means for conveying energy between each of said radiators and a radio equipment, one of said resonant slot radiators being positioned nearer to said boundary than the other of said resonant slot radiators by a distance substantially an odd number of quarter wavelengths at the operating frequency.

Yet another expedient which may be employed in carrying the invention into effect consists in the provision of an antenna system comprising a conductive structure having two opposite surfaces meeting at a common boundary, a resonant slot radiator, having a plane of polarisation cutting said boundary, formed in each of said opposite surfaces, feeding means for conveying energy between each of said radiators and a radio equipment, the electrical length of the feeding means between one of said resonant slot radiators and said radio equipment exceeding the electrical length of the feeding means between the other of said resonant slot radiators and the radio equipment by an amount substantially an odd number of quarter wavelengths at the operating frequency. The provision of feeder paths of differing electrical lengths for the two radiators may be effected by feeding one of the radiators directly from the radio equipment and providing a linking feeder of appropriate length through which the other radiator is fed from the directly fed radiator.

It has been found that the best results can be obtained if the difference in the electrical path lengths between the radio equipment and the boundary of the structure at which cancellation between the signals is to be avoided is arranged to be of the order of an odd number of quarter wavelengths at the operating frequency, that is to say at the mid frequency of the frequency band which the antenna is required to cover.

The invention will be more clearly understood from the following description in which a variety of practical embodiments will be described by way of example with reference to the accompanying drawings in which:

Fig. 1 is an elevation view of an aircraft tail fin embodying an antenna system according to the invention.

Figs. 1a and 1b are sectional views of two alternative arrangements which may be employed in the system illustrated in Fig. 1.

Fig. 2 is an elevation view of an aircraft tail fin embodying an alternative antenna system according to the invention.

Figs. 2a, 2b, 2c and 2d are sectional views of four alternative arrangements which may be employed in the antenna system illustrated in Fig. 2.

Fig. 3 is an elevation view of an aircraft tail fin embodying yet another form of antenna system according to the invention, and Fig. 3a is a sectional view of one arrangement which may be used in the system illustrated in Fig. 3.

Referring first to Figs. 1, 1a and 1b, Fig. 1 shows a vertical slot 1, of a suitable length to be resonant over the desired operating frequency band, cut in the skin of a tail fin 2 of an aircraft. A similar slot 1a is cut in the skin on the opposite side of the fin, in alignment with the slot 1. Behind slot 1 is provided a metal box 4 and behind slot 1a a metal box 5, each of which boxes constitutes a resonant cavity through which energy is fed to or from the respective slot. Box 4 is excited by a probe 10 and box 5 by a probe 11. Energy is fed to or from the probes 10 and 11 in the arrangement shown in Fig. 1a by means of a feeder cable 6 which connects probe 10 to a radio equipment 3 and by a delay line 7, constituted by a short length of feeder cable, which connects probe 11 to probe 10. The length of the delay line 7 is so chosen that a phase shift of the order of 90° at the mid frequency of the operating band is imposed upon energy passing between the two probes. It will thus be seen that if the arrangement is used for transmission the radiation from slot 1 will take place with approximately 90° phase difference from that radiated from slot 1a. Such a phase relationship has been found to reduce materially the tendency for the radiations from opposite sides of the fin to cancel one another at the edges of the fin in the horizontal plane through the centre of the slots.

The arrangement shown in Fig. 1b is in all essential respects the same as that of Fig. 1a except that probes 10 and 11 are fed separately through cables 12 and 13, which cables differ in electrical length by an amount of the order of an odd number of quarter wavelengths at the mid frequency of the operating band. The effect obtained therefore will be the same as has been described above for the arrangement of Fig. 1a. It will be appreciated that if the system is used for reception the slots 1 and 1a will resonate out of phase under the action of radiations arriving from directions in line with the axis of the tail fin in the horizontal plane through the slots so that a relative phase shift will be introduced by the difference in feeder lengths between each slot and the radio equipment whereby the energy will arrive at the radio equipment in an additive phase relationship.

Referring now to Figs. 2, 2a, 2b, 2c and 2d the tail fin 20 of an aircraft is in each case shown provided with resonant slot radiators 21 and 22 cut in the opposite surfaces of the tail fin, of a suitable length to be resonant over the desired operating frequency band. In each case the slots are arranged at different distances from the vertical edges of the fin 20 or in other words are staggered about a plane perpendicular to the transverse axis of the tail fin. The sectional views of Figs. 2a to 2d show four alternative ways in which these slots may be excited. In the arrangement of Fig. 2a a single cavity 23 forming a resonant feed for both of the slots 21 and 22 is formed between the two surfaces of the tail fin, its side walls being arranged slanting to accommodate the staggered positioning of slots 21 and 22. The cavity is excited by a single probe 24 connected through a cable 25 with the radio equipment (not shown). The staggering of the slots 21 and 22 is arranged to give a spacing between the slots, in the direction of the axis of the fin, of the order of an odd number of quarter wavelengths at the mid frequency of the operating band.

The arrangement of Fig. 2b differs from that of Fig. 2a only in that two separate resonant cavity boxes are provided, one behind each resonant slot, each cavity being excited by a separate probe, the two probes being connected to the radio equipment (again not shown) through separate cables of equal electrical length. It should be pointed out, however, that by an arrangement such as that shown in Fig. 2b it is possible to modify the staggering of the two slots according to constructional requirements and to introduce a further difference in the electrical path lengths between the radio equipment and the edges of the tail fin through the respective slots by making the two feed cables of different electrical lengths. If such a provision is not required, however, an arrangement such as that shown in Fig. 2c may be employed in which two probes 26 and 27 are employed one in each resonant cavity and both connected through a common cable 28 to the radio equipment.

The arrangement of Fig. 2d is equivalent to that of Fig. 2b but employs resonant cavity metal boxes, behind the two slot radiators, which are less in depth than the thickness of the tail fin structure. Such an arrangement may be preferable in some circumstances and may be usefully employed where structural considerations render the arrangements shown in Figs. 1b and 2b both unsuitable.

In Figs. 3 and 3a the arrangement is shown in which the tail fin 30 of an aircraft is provided with resonant slot radiators 31 and 32 arranged in alignment on opposite sides thereof, the slots being energised by means of resonant cavities energised by probes and connected with the radio equipment through feeder cables of equal electrical length. The desired correction of the horizontal polar diagram of the arrangement is in this case effected by providing on one side of the tail fin a slot 33 cut in the metal skin and arranged to be of such a length and at such a spacing from slot 32 that it acts as a parasitic reflector for radiations from slot 32, and a further slot 34 arranged to act as a parasitic director for these radiations. On the other side of the tail fin a slot 35 is provided arranged to act as a parasitic reflector to resonant slot 31 but arranged on the side of slot 31 remote from that upon which slot 33 is positioned and a further slot 36 arranged to act as a parasitic director for these radiations. In this arrangement it is possible to omit slots 33 and 35 or 34 and 36 and still obtain a correction of the horizontal polar diagram. Alternatively the arrangement may be extended by the provision of further parasitic reflectors or directors to enhance the directional effects of slots 33, 34, 35 and 36, the arrangement being designed according to the results required.

It will be appreciated that this latter expedient can be adopted in addition to either or both of the expedients described with reference to Figs. 1 to 2d. Indeed, any desired combination of the various arrangements shown can be employed, the choice being made in accordance with the limitations imposed structurally by the aerodynamic design of the tail fin.

Finally, although simple half wave slot radiators have been described throughout, other types of slot radiators may be used, such as, for example, so called folded slots.

It will further be understood that the slots may be energised other than by way of resonant cavities and probes, for example by direct connection of the feeders to the slots themselves in known manner. In general, moveover, the slots will be filled or covered with dielectric material so as to preserve the aerodynamic properties of the tail fin.

Although the invention is primarily of value in the situation above described, namely to provide a substantially uniform omnidirectional horizontal polar diagram for horizontally polarised transmission or reception on aircraft, the invention is applicable to other purposes in connection with aircraft radio equipments and may be employed wherever a radiation pattern of the kind described is required from an antenna and the circumstances call for slot type radiators in a structure of limited size.

We claim:

1. An antenna system comprising a structure having two conductive surfaces meeting at a line of intersection, a resonant slot radiator formed in each of said surfaces, said radiators having a plane of polarisation passing through a common portion of said line and feeding means for conveying energy between each of said radiators and a radio equipment, the two electrical path lengths afforded through the two radiators between said radio equipment and said line of intersection in said plane of polarisation differing by substantially an odd number of quarter wavelength at the operating frequency.

2. An antenna system comprising a pair of substantially parallel conductive sheets terminating at a common boundary a resonant slot radiator, having a plane of polarisation passing through a common portion of said boundary, formed in each of said sheets, and feeding means for conveying energy between each of said resonators and a radio equipment, the distance of one of said radiators from said boundary in said plane of polarisation and the electrical length of the respective feeding means being together greater, by substantially an odd number of quarter wavelengths at the operating frequency, than the distance of the other radiator from said boundary in said plane of polarisation added to the electrical length of its respective feeding means.

3. An antenna system comprising a conductive structure having two opposite surfaces meeting at a common boundary, a resonant slot radiator, having a plane of polarisation passing through a common portion of said boundary, formed in each of said opposite surfaces, feeding means for conveying energy between each of said radiators and a radio equipment, one of said resonant slot radiators being positioned nearer to said boundary than the other of said resonant slot radiators by a distance of substantially an odd number of quarter wavelengths at the operating frequency.

4. An antenna system comprising a conductive structure having two opposite surfaces meeting at a common boundary, a resonant slot radiator, having a plane of polarisation passing through a common portion of said boundary, formed in each of said opposite surfaces, feeding means for conveying energy between each of said radiators and a radio equipment, the electrical length of the feeding means between one of said resonant slot radiators and said radio equipment exceeding the electrical length of the feeding means between the other of said resonant slot radiators and the radio equipment by substantially an odd number of quarter wavelengths at the operating frequency.

5. An antenna system comprising a conductive structure having two opposite surfaces meeting at a common boundary, a resonant slot radiator, having a plane of polarisation passing through a common portion of said boundary, formed in each of said opposite surfaces, feeding means for conveying energy between one of said resonant slot radiators and a radio equipment and feeding means for conveying energy between the two resonant slot radiators, said last named feeding means having an electrical length of substantially an odd number of quarter wavelengths at the operating frequency.

6. An antenna system comprising a conductive structure having two opposite surfaces intersecting in a line, a resonant slot radiator having a plane of polarisation passing through a limited portion of said line formed in each of said surfaces and feeding means for conveying energy between each of said radiators and a radio equipment, the two electrical path lengths afforded through the two radiators between said radio equipment and said line of intersection in said plane of polarisation differing by an odd number of quarter wavelengths at the operating frequency.

7. An antenna system comprising an aerofoil having distinct surface meeting at boundary edges of said aerofoil, a resonant slot radiator, having a plane of polarisation passing through a common portion of a boundary edge of said aerofoil, formed in each of said surfaces and feeding means for conveying energy between each of said radiators and a radio equipment, the two electrical path lengths afforded through the two radiators between said radio equipment and said edge in said plane of polarisation differing by a distance of substantially an odd number of quarter wavelengths at the operating frequency.

8. An antenna system comprising a tail fin having distinct surfaces meeting at boundary edges of said tail fin, a resonant slot radiator, having a plane of polarisation passing through a common portion of a boundary edge of said tail fin, formed in each of said surfaces and feeding means for conveying energy between each of said radiators and a radio equipment, the two electrical path lengths afforded through the two radiators between said radio equipment and said edge in said plane of polarisation differing by an odd number of quarter wavelengths at the operating frequency.

9. An antenna system comprising a conductive structure having two substantially planar surfaces intersecting and terminating in a common line, each of said surfaces having formed therein a resonant slot radiator, each of said radiators being disposed rearwardly of said line, one of said radiators being positioned nearer said line than the other of said radiators by a distance of substantially an odd number of quarter wavelengths at the operating frequency.

10. An antenna system comprising a conductive structure having two substantially planar surfaces meeting at a line of intersection, each of said surfaces having formed therein a resonant slot radiator rearward of said line, feeding means for conveying energy between each of said radiators and a radio equipment, the electrical lengths of said feeding means differing in respect to each of said radiators so that there is substantially a 90 degree phase difference in the energy radiated from each of said slots.

11. An antenna system as claimed in claim 3 and wherein the said feeding means comprise a cavity arranged within the conductive structure between the two opposite slotted surfaces, a probe projecting into the cavity and a feeder connected between the probe and the said radio equipment.

12. An antenna system as claimed in claim 3 and wherein the said feeding means comprises a cavity within the conductive structure and having one of the slot radiators in one wall thereof, a second cavity within the conductive structure and having the other of the slot radiators in one wall thereof, a probe projecting into each of the cavities and a feeder connected between each of the probes and the radio equipment.

13. An antenna system as claimed in claim 3 and wherein the said feeding means comprises a cavity arranged within the conductive structure and having one of the slot radiators in one wall thereof, a wall common to both of the said cavities, a probe projecting into each of the said cavities from the common wall thereof and a feeder connecting each of the probes to the radio equipment.

WILLIAM ARTHUR JOHNSON.
REX HENRY JOHN CARY.

References Cited in the file of this patent

UNITED STATES PATENTS

| Number | Name | Date |
| --- | --- | --- |
| 2,400,867 | Lindenblad | May 21, 1946 |
| 2,405,242 | Southworth | Aug. 6, 1946 |
| 2,412,320 | Carter | Dec. 10, 1946 |
| 2,414,266 | Lindenblad | Jan. 14, 1947 |
| 2,425,303 | Carter | Aug. 12, 1947 |
| 2,479,227 | Gilbert | Aug. 16, 1949 |
| 2,543,468 | Riblet | Feb. 27, 1951 |

OTHER REFERENCES

Proc. IRE, May 1947, pages 477–478.

Journal of the Institution of Electrical Engineers, vol. 93, Part IIIA, No. 4, pages 776–777, May 1946.